(12) United States Patent
Kim et al.

(10) Patent No.: US 9,068,079 B2
(45) Date of Patent: *Jun. 30, 2015

(54) BAR TYPE CLAY FOR CRAFT

(75) Inventors: Hak-Jae Kim, Daejeon (KR); Han-Shin Jung, Daejeon (KR); Ji Eun Lee, Daejeon (KR)

(73) Assignee: DONG-A TEACHING MATERIALS CO., LTD., Daejeon (KR)

( * ) Notice: Subject to any disclaimer, the term of this patent is extended or adjusted under 35 U.S.C. 154(b) by 294 days.

This patent is subject to a terminal disclaimer.

(21) Appl. No.: 12/984,747

(22) Filed: Jan. 5, 2011

(65) Prior Publication Data

US 2011/0168054 A1 Jul. 14, 2011

(30) Foreign Application Priority Data

Jan. 8, 2010 (KR) .......................... 10-2010-0001767

(51) Int. Cl.
*C08L 91/06* (2006.01)
*B44C 3/04* (2006.01)

(52) U.S. Cl.
CPC .. *C08L 91/06* (2013.01); *B44C 3/04* (2013.01)

(58) Field of Classification Search
CPC ............. C01P 2004/61; C01P 2006/22; C01P 2006/60; C08J 3/226; C09D 7/005
See application file for complete search history.

(56) References Cited

U.S. PATENT DOCUMENTS

| | | | | |
|---|---|---|---|---|
| 32,999 A | * | 8/1861 | Ueyama | 241/140 |
| 2,348,039 A | * | 5/1944 | Ulrich et al. | 442/83 |
| 3,410,684 A | * | 11/1968 | Printz | 419/2 |
| 3,594,209 A | * | 7/1971 | Kosche | 428/488.11 |
| RE32,999 E | | 7/1989 | Ueyama | |
| 6,837,924 B2 | | 1/2005 | Breindl et al. | |
| 2003/0131758 A1 | * | 7/2003 | Breindl et al. | 106/271 |
| 2006/0233866 A1 | * | 10/2006 | Hauser et al. | 424/443 |

FOREIGN PATENT DOCUMENTS

| | | |
|---|---|---|
| CN | 1352215 | 6/2002 |
| CN | 1817969 | 8/2006 |
| CN | 101348361 | 1/2009 |
| CN | 101648805 | 2/2010 |
| EP | 0478722 | 4/1992 |
| RU | 2103289 | 1/1998 |
| RU | 2291776 | 1/2007 |
| SU | 773055 | 10/1980 |

OTHER PUBLICATIONS

International Searching Authority FIPS, Search Reportt of Turkish Patent Application No. 2011/174, Dec. 14, 2011, Moscow, RU.
Oil processing technology, Shaozhou Chen et al., Dec. 31, 1997 pp. 35-36, East China University of Science and Technology press.

* cited by examiner

*Primary Examiner* — Bijay Saha
(74) *Attorney, Agent, or Firm* — Lexyoume IP Meister, PLLC

(57) ABSTRACT

Bar type clay for craft including 50 wt % to 80 wt % of wax, 10 wt % to 40 wt % of body pigment, and 1 wt % to 10 wt % of a colorant, and formed to have a bar-like shape is provided.

4 Claims, 2 Drawing Sheets
(1 of 2 Drawing Sheet(s) Filed in Color)

BAR TYPE CLAY FOR CRAFT

CROSS-REFERENCE TO RELATED APPLICATION

This application claims priority to and the benefit of Korean Patent Application No. 10-2010-0001767 filed in the Korean Intellectual Property Office on Jan. 8, 2010, the entire contents of which are incorporated herein by reference.

BACKGROUND OF THE INVENTION (a) Field of the Invention

The present invention relates to bar type clay for craft and, more particularly, to bar type clay for craft which is formed to have a bar-like shape so as to be easily and conveniently used in crafting, has good extrusion (or extrusion formability) and shape consistency (or shape retainability), provides excellent formability in crafting, and does not cause a problem such as sticking, adhering, or the like.

(b) Description of the Related Art

In general, clay crafting or working is carried out to create various objects by using clay in houses, schools, institutes, kindergartens, and the like, in order to arouse children's or student's interest and develop creativity Clay used in the crafting operation may be real clay; however, because real clay is hard to be purchased or supplied and has a limitation in expressing various forms, shapes, or colors, so, in general, clay for craft (or artificial clay) manufactured in factories and sold is largely used.

For example, the conventional clay for craft is mixed with a plasticizer, a thickener, a coloring matter (or pigment), water, and the like, and manufactured to have a shape advantageous for distribution, packaging, and handling, and then distributed on the market.

Meanwhile, one of shapes of clay occasionally or frequently created in clay working is a bar-like shape, and the conventional clay for craft is short of retainability, causing a problem that the shape of created clay can be hardly retained and it is difficult to create several pieces of uniform bar type clay.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide bar type clay for craft which is fabricated by using wax, body pigment, and a colorant (or a coloring agent) in order to have good extrusion (or extrusion formability) and shape consistency (or shape retainability), provides excellent formability in crafting, and prevent the occurrence of sticking, adhering, and the like, can be formed to have a bar-like shape so as to be favorably used to make various expressions in performing clay working.

An exemplary embodiment of the present invention provides bar type clay for craft may include wax, body pigment, and a colorant and may be formed to have a bar-like shape.

As the wax, wax having a melting point ranging from 50° C. to 90° C. and penetration ranging from 10 to 150 (relevant standard: KS M2252, ASTM D5, AASHTO T49) may be used.

Preferably, as the wax, wax having a melting point ranging from 60° C. to 80° C. and penetration ranging from 30 to 100 (relevant standard: KS M2252, ASTM D5, AASHTO T49) is used.

When the penetration of the wax exceeds 150, performance and formability of clay deteriorate to make it difficult to perform crafting.

One of microwax, beeswax, and Japan wax may be used as the wax or two more of them may be mixed to be used.

The wax may be used by 50 wt % to 80 wt %.

When the wax is used by less than 50 wt %, formability deteriorates, and when the wax is used by more than 80 wt %, shape retainability is hardly maintained and sticking characteristics increases to allow debris to be easily adhered and stuck to a user's hand, causing contamination.

One of calcium carbonate, kaolin clay, talc, and magnesium carbonate may be used as the body pigment, or two or more of them may be mixed to be used.

The body pigment may be used by approximately 10 wt % to 40 wt %.

When the body pigment is used by less than 10 wt %, extrusion deteriorates and sticking characteristics increases, and when the body pigment is used by more than 40 wt %, formability in crafting deteriorates.

One of organic pigment, inorganic pigment, fluorescence pigment, metal pigment, pearl pigment, and phosphorescent pigment may be used as the colorant, or two or more of them may be mixed to be used.

The colorant may be used by approximately 1 wt % to 10 wt %.

When the colorant is used by more than 10 wt %, pigment, or the like, may be stuck to the user's hand or the user's hand may be colored.

According to an embodiment of the present invention, because the bar type clay for craft is formed to have a bar-like shape by using a wax, body pigment, and a colorant, it can be advantageously used in clay working.

Also, according to an embodiment of the present invention, because the bar type clay for craft has good extrusion (or extrusion formability) and shape consistency (or shape retainability), provides excellent formability in crafting, and does not cause a problem such as sticking, adhering, or the like, it can be conveniently used and make various expressions in clay working.

In addition, according to an embodiment of the present invention, because the bar type clay for craft can be softened by a body temperature and can be hardened at room temperature, it can become soft and flexible as the user touches it, allows for easy and convenient crafting to obtain a shape requiring flexibility, such as a character shape, a number shape, a twisted shape, a coil shape, and the like, and can be repeatedly used again.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE EMBODIMENTS

Bar type clay for craft according to an exemplary embodiment of the present invention will now be described.

[Exemplary Embodiment 1]

65 wt % of microwax (whose melting point is 75° C. and penetration is 40) was heated and melted at 85° C., into which 25 wt % of magnesium carbonate, 5 wt % of titanium oxide, 4 wt % of Yellow 2GS (UKSEUNG CHEMICAL CO. LTD.) were then added, melted and dispersed. A rolling process was performed twice on the resultant material to create a block, and the block was extruded by using an extruder to obtain yellow bar type clay for craft having a circular section with a diameter of 3 mm of Exemplary embodiment 1.

[Exemplary Embodiment 2]

60 wt % of microwax (whose melting point is 68° C. and penetration is 45) was heated and melted at 85° C., into which 31 wt % of magnesium carbonate, 5 wt % of titanium oxide, 4 wt % of Red 2RM (UKSEUNG CHEMICAL CO. LTD.) were then added, melted and dispersed. A rolling process was performed twice on the resultant material to create a block, and the block was extruded by using an extruder to obtain red bar type clay for craft having a circular section with a diameter of 4 mm.

COMPARATIVE EXAMPLE 1

60 wt % of paraffin wax (whose melting point is 45° C. and penetration is 170) was heated and melted at 85° C., into which 31 wt % of magnesium carbonate, 5 wt % of titanium oxide, 4 wt % of Red 2RM (UKSEUNG CHEMICAL CO. LTD.) were then added, melted and dispersed. A rolling process was performed twice on the resultant material to create a block, and the block was extruded by using an extruder to obtain red bar type clay for craft having a circular section with a diameter of 4 mm.

Extrusion formability, shape retainability, formability in crafting, sticking, and adhesion of the thusly obtained Exemplary embodiment 1, Exemplary embodiment 2, and Comparative Example 1 were checked through experiences.

First, it was confirmed that Exemplary embodiment 1 and Exemplary embodiment 2 have good extrusion formability and shape retainability, excellent formability in crafting, and does not have any problem with sticking, adhesion, or the like.

Meanwhile, it was confirmed that Comparative Example 1 has melting point lower than 50(C, which is too low, and penetration of 150, which is too high, resulting in a bad extrusion formability and too insufficient shape retainability to retain the shape and a problem with sticking, adhesion, or the like, in performing crafting.

Figure 1:
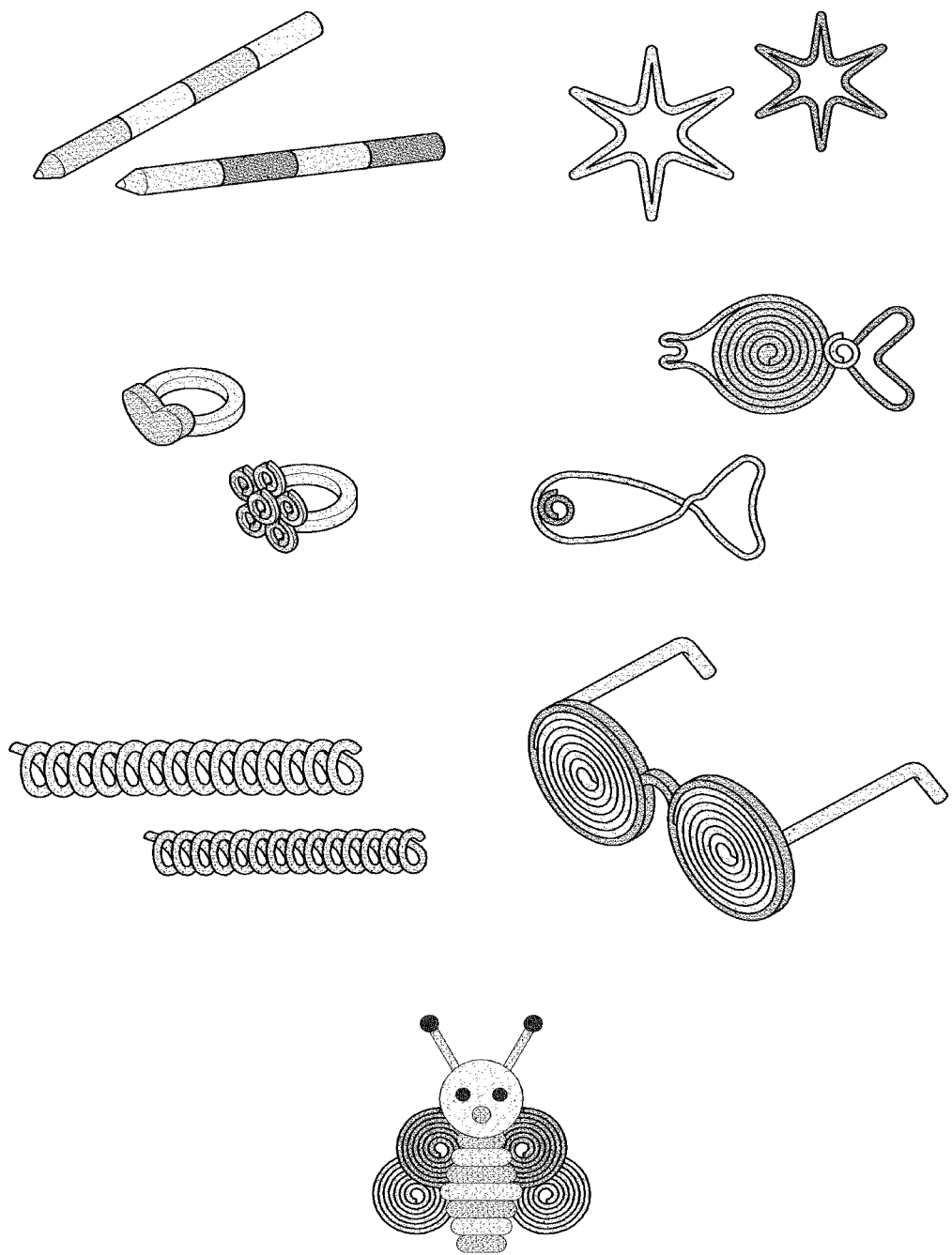
FIG. 1 shows craft products manufactured by using bar type clay for craft according to an exemplary embodiment of the present invention.
Figure 2:
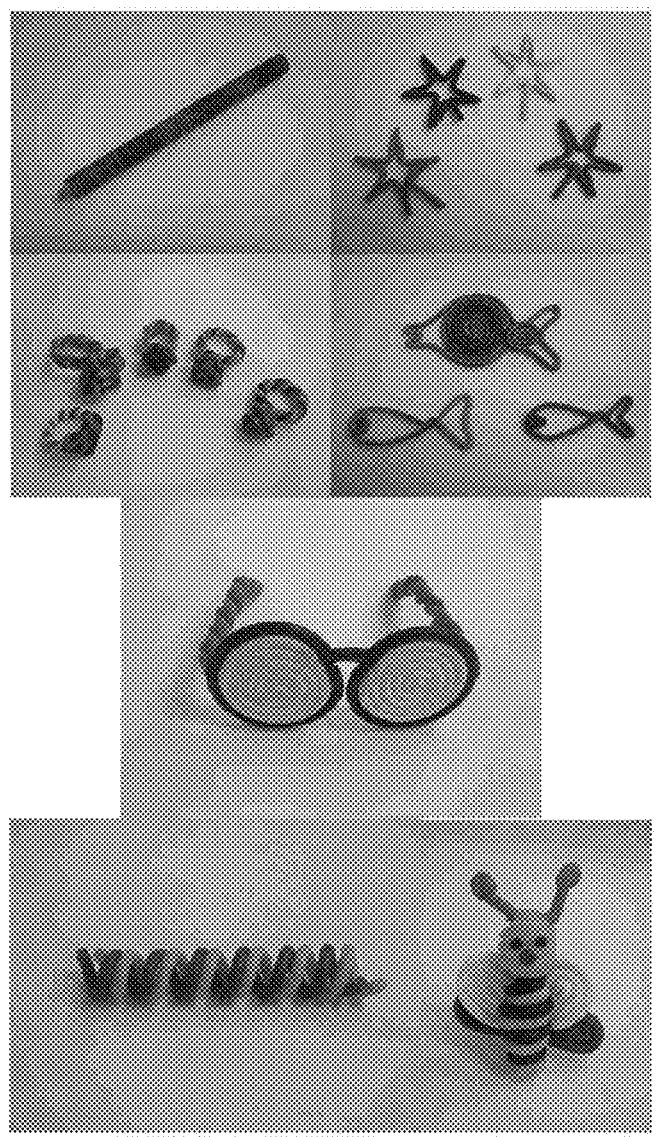
FIG. 2 is a color photograph showing craft products manufactured by using bar type clay for craft according to an exemplary embodiment of the present invention.

The use of the bar type clay for craft according to exemplary embodiments of the present invention ensures various expressions in crafting, and allows for crafting in various shapes such as a spring, a fish, a star, a butterfly, and the like, as shown in FIGS. 1 and 2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A clay bar for craft consisting of 50 wt % to 80 wt % of a wax, 10 wt % to 40 wt % of a body pigment, and 1 wt % to 10 wt % of a colorant, and formed to have a bar shape, wherein the wax consists of one or more wax selected from microwax and beeswax,
wherein one of calcium carbonate, kaolin clay, talc, and magnesium carbonate is used as the body pigment, or two or more of them are mixed to be used.

2. The clay bar of claim 1, wherein the wax has a melting point ranging from 50° C. to 90° C. and penetration ranging from 10 to 150.

3. The clay bar of claim 1, wherein one of organic pigment, inorganic pigment, fluorescence pigment, metal pigment, pearl pigment, and phosphorescent pigment is used as the colorant, or two or more of them are mixed to be used.

4. The clay bar of claim 2, wherein the wax has a melting point equal to or higher than 60° C. and lower than 80° C.

* * * * *